United States Patent
Ingale et al.

(10) Patent No.: US 12,295,046 B2
(45) Date of Patent: May 6, 2025

(54) METHOD AND UE FOR HANDLING RESOURCE ALLOCATION IN WIRELESS COMMUNICATION SYSTEM

(71) Applicant: Samsung Electronics Co., Ltd., Suwon-si (KR)

(72) Inventors: Mangesh Abhimanyu Ingale, Bangalore (IN); Fasil Abdul Latheef, Bangalore (IN); Anil Agiwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/768,122

(22) PCT Filed: Oct. 14, 2020

(86) PCT No.: PCT/KR2020/014008
§ 371 (c)(1),
(2) Date: Apr. 11, 2022

(87) PCT Pub. No.: WO2021/075850
PCT Pub. Date: Apr. 22, 2021

(65) Prior Publication Data
US 2024/0373477 A1    Nov. 7, 2024

(30) Foreign Application Priority Data

Oct. 14, 2019   (IN) .............................. 201941041533
Oct. 11, 2020   (IN) .............................. 2019 41041533

(51) Int. Cl.
*H04W 74/0833*    (2024.01)
*H04W 60/00*    (2009.01)
(Continued)

(52) U.S. Cl.
CPC ....... *H04W 74/0841* (2013.01); *H04W 60/00* (2013.01); *H04W 74/0836* (2024.01); *H04W 88/06* (2013.01)

(58) Field of Classification Search
CPC ......... H04W 74/0841; H04W 74/0836; H04W 60/00; H04W 88/06
See application file for complete search history.

(56) References Cited

U.S. PATENT DOCUMENTS

2004/0147271 A1*   7/2004   Billon ................... H04W 68/00
                                                       455/458
2011/0170420 A1*   7/2011   Xi ........................... H04L 5/001
                                                       370/328
(Continued)

FOREIGN PATENT DOCUMENTS

EP      3 030 030 B1     9/2017
EP      3345444          7/2018
(Continued)

OTHER PUBLICATIONS

RP-191898 (IDS Cited NPL reference) (Year: 2019).*
(Continued)

*Primary Examiner* — Kevin C. Harper
*Assistant Examiner* — Guoxing Fan
(74) *Attorney, Agent, or Firm* — Jefferson IP Law, LLP

(57) ABSTRACT

The present disclosure relates to a 5G communication system or a 6G communication system for supporting higher data rates beyond a 4G communication system such as long term evolution (LTE). Accordingly, embodiments herein disclose a system and method for handling resource allocation in wireless communication system. The method includes registering, by a UE, a first SIM among a plurality of SIMs with a first network entity in the wireless communication system and a second SIM among plurality of SIMs with a second network entity in wireless communication (Continued)

system. Further, the method includes configuring, by the UE, a RF resource with the first SIM for at least one of a downlink reception and uplink transmission. Further, the method includes determining, by the UE, whether second SIM needs RF resource. Further, the method includes performing, by the UE, provisioning of RF resource based on the determination.

18 Claims, 5 Drawing Sheets

(51) Int. Cl.
*H04W 74/0836* (2024.01)
*H04W 88/06* (2009.01)

(56) References Cited

U.S. PATENT DOCUMENTS

| | | | |
|---|---|---|---|
| 2015/0099516 A1 | 4/2015 | Nayak et al. | |
| 2016/0050686 A1* | 2/2016 | Krishnamoorthi | H04W 28/04 455/418 |
| 2017/0127329 A1* | 5/2017 | Maheshwari | H04W 76/15 |
| 2018/0042054 A1* | 2/2018 | Han | H04W 74/0841 |
| 2020/0267762 A1* | 8/2020 | Lee | H04W 76/27 |
| 2021/0212107 A1* | 7/2021 | Lu | H04L 1/001 |
| 2022/0330265 A1* | 10/2022 | Luo | H04W 72/20 |
| 2022/0394543 A1* | 12/2022 | Wang | H04W 72/21 |

FOREIGN PATENT DOCUMENTS

| | | |
|---|---|---|
| KR | 10-2016-0067956 A | 6/2016 |
| WO | 2017/040168 A1 | 3/2017 |

OTHER PUBLICATIONS

Vivo (Moderator), RP-191898, Report of phase 1 Multi-SIM email discussion, 3GPP TSG-RAN WG Meeting #85, Newport Beach, USA, Sep. 16-20, 2019.

Huawei, HiSilicon, S2-1909261, Discussion on Handling of Service Prioritization, 3GPP TSG SA Meeting #135, Split, Croatia, Oct. 14-18, 2019.

Views on NR Rel-17, RP-191449, 3GPP TSG RAN Meeting #84, Newport Beach, USA, Jun. 3-6, 2019.

Intel, C1-181605, PLMN selection and cell (re-)selection for dual-registration mode, 3GPP TSG-CT WG1 Meeting #109, Montreal (Canada), Feb. 26-Mar. 2, 2018.

Indian Office Action dated Jun. 12, 2021, issued in Indian Application No. 201941041533.

International Search Report and written opinion dated Jan. 20, 2021, in International Application No. PCT/KR2020/014008/.

* cited by examiner

METHOD AND UE FOR HANDLING RESOURCE ALLOCATION IN WIRELESS COMMUNICATION SYSTEM

CROSS-REFERENCE TO RELATED APPLICATION(S)

This application is a U.S. National Stage application under 35 U.S.C. § 371 of an International application number PCT/KR2020/014008, filed on Oct. 14, 2020, which is based on and claims priority of an Indian provisional patent application number 201941041533, filed on Oct. 14, 2019, in the Indian Intellectual Property Office, and of an Indian complete patent application number 201941041533, Oct. 11, 2020, filed in the Indian Intellectual Property Office, the disclosure of each of which is incorporated by reference herein in its entirety.

TECHNICAL FIELD

The present disclosure relates to a wireless communication system, and more specifically relates to a system and method for handling resource allocation in the wireless communication system.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the ¹/₁₀ radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collison avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In User Equipment (UE) that are currently available commercially, an operation in a presence of multiple universal subscriber identity module (USIMs) are based on UE implementation. There is no standard behavior and different UE vendors may have different implementations. The current $3^{rd}$ Generation Partnership Project (3GPP) specifications (i.e., release 16) only define UE operation based on a single USIM.

There are different multi USIM (or dual USIM) architectures currently available. The two most prominent architecture models are Dual SIM Dual Standby (DSDS) and Dual SIM Dual Active (DSDA). The difference in procedures between the two architecture models arrive from the difference in hardware capability of the UE. While the DSDA device requires dual RX and TX, the DSDS device does not require dual Tx as only one SIM is active at a time.

The basic operation that the 2 USIMs perform irrespective of the architecture models, is paging monitoring on each of the USIMs. Both these USIMs may belong to a same network or different network operators and it is not possible for the network to identify that the UE is a dual SIM capable device or the device is operating as a dual SIM UE. Even with the UE is in a radio resource control (RRC) connected state on one of the USIMs, the UE still has to monitor paging occasions on the other USIM to know if there is a potential paging to the UE. It is also possible that the paging or other time critical activity (like random access) on both the USIMs collide in time domain. Therefore, the UE needs to decide on which of these colliding receptions can the UE receive and potentially respond to. This means that the UE misses reception on the other USIM or stack. There are no methods defined in prior arts on how the UE can recover from this collision.

Thus, it is desired to address the above mentioned disadvantages or other shortcomings or at least provide a useful alternative.

The principal object of the embodiments herein is to provide a UE and method for handling resource allocation in a wireless communication system.

Another object of the embodiment herein is to provide a RF preservation and retention during ongoing random access procedure.

Another object of the embodiment herein is to provide a method to delay random access on a USIM based on RF requirement on other USIM.

Another object of the embodiment herein is to provide a RF resource re-provisioning based on SI opportunities available in a SI modification period.

Another object of the embodiment herein is to provide a method to broadcast paging repetition cycle to the UE.

Another object of the embodiment herein is to provide a method to indicate optimized UE specific DRX cycle from a wireless network.

DISCLOSURE OF INVENTION

Solution to Problem

Accordingly, embodiments herein disclose a method for handling resource allocation in a wireless communication system. The method includes registering, by a UE, a first SIM among a plurality of SIMs with a first network entity in the wireless communication system and a second SIM among the plurality of SIMs with a second network entity in the wireless communication system. Further, the method includes configuring, by the UE, a RF resource with the first SIM for at least one of a downlink reception and uplink transmission. Further, the method includes determining, by the UE, whether the second SIM needs the RF resource. Further, the method includes performing, by the UE, provisioning of the RF resource, comprising one of in response to determining that the second SIM does not need the RF resource, retaining the RF resource with first SIM and receiving the resource allocation, and in response to determining that the second SIM needs the RF resource, performing one of determining that an ongoing procedure on the first SIM is having a higher priority, and retaining the RF resources with the first SIM, determining that a RF resource requirement on the second SIM is having higher priority, and releasing the RF resource by the first SIM and providing the RF resources to the second SIM, and determining that a RF resource requirement on the second SIM is having a higher priority, deferring an ongoing procedure on the first SIM, and providing the RF resource to the second SIM.

In an embodiment, provisioning of the RF resource between the first SIM and the second SIM comprises at least one of receiving a system information, monitoring a random access RAR window at the UE, monitoring a contention resolution timer at the UE, occurring of a 2-step random access procedure, and an occasion of a SI window for a requested on demand SI acquisition within a modification period.

In an embodiment, the RF resources includes the antenna and elements in the RF processing chain on the UE.

In an embodiment, determining, by the UE, whether the second SIM needs the RF includes identifying, by the UE, a need for the RF resource on the second SIM, determining, by the UE, that a priority associated with at least one service to be accessed by the first SIM is lesser than a priority associated with at least one service with the second SIM, and determining, by the UE, whether the second SIM needs the RF in response to determining that the priority associated with the at least one service to be accessed by the first SIM is lesser than the priority associated with the at least one service with the second SIM.

In an embodiment, determining, by the UE, whether the second SIM needs the RF includes configuring a logical channel priority threshold, determining by the UE, whether a service on the first SIM is ongoing on a logical channel with a priority higher than the configured logical channel priority threshold, and performing one of in response to determining that the service on the first SIM is ongoing on the logical channel with the priority higher than the configured logical channel priority threshold, retaining the RF resources on the first SIM, and in response to determining that the service on the first SIM is ongoing on the logical channel with the priority lesser than the configured logical channel priority threshold, provisioning the RF resources from the first SIM to the second SIM.

In an embodiment, the logical channel priority threshold is configured by at least one of the UE and a wireless network.

In an embodiment, determining, by the UE, whether the second SIM needs the RF includes identifying, by the UE, that the second SIM needs the RF resource, determining, by the UE, a priority type of a random access (RA) trigger, and performing, by the UE, one of retaining the RF resource on the first SIM, if the priority type of the RA trigger is a high priority, and deferring random access (RA) on the first SIM and providing the RF to the second SIM, if the priority type of the RA trigger is a lower priority.

In an embodiment, the method further comprises identifying, by the UE, collision of the RF resource for the second SIM, indicating, by the UE, the collision of RF resources to the second network entity using an UE assistance information, and providing, by the wireless network, confirmation about accepting the UE assistance information provided by the UE.

In an embodiment, the assistance information comprises at least one of a preferred Discontinuous Reception (DRX) parameters, by the UE, a preferred offset to paging frame where paging will be monitored, a preferred offset to paging occasion where a paging will be monitored, and a wireless network confirms if the UE applies UE specific DRX parameters based on an updated paging frame (PF) and paging occasion (PO) offsets for paging monitoring.

In an embodiment, the assistance information is provided as one of as part of a Radio resource control (RRC) message and a bit in a registration request.

In an embodiment, the method further comprises identifying by a wireless network, that collision for RF resource exists; and transmitting by the wireless network, repetition of a paging message on one of the first network entity and the second network entity to the UE based on the identification.

In an embodiment, the collision refers to occasion at which the first SIM and the second SIM needs RF resources at the same time.

In an embodiment, the paging message comprises paging cycles and allocating the RF resources to the first SIM and the second SIM.

In an embodiment, a presence of the paging repetition is signaled based on a bitmap, wherein the bitmap indicates an index of paging cycles over which the repetition exists.

Accordingly, embodiments herein disclose a UE for handling resource allocation in a wireless communication system. The UE includes a plurality of SIMs associated with a RF resource, and a processor coupled with the plurality of SIMs. The processor is configured to register a first SIM among the plurality of SIMs with a first network entity in the wireless communication system and a second SIM among the plurality of SIMs with a second network entity in the wireless communication system. Further, the processor configures a RF resource with the first SIM for at least one of a downlink reception and uplink transmission. Further, the processor determines whether the second SIM needs the RF resource. Further, the processor performs provisioning of the RF resource comprising one of in response to determine that the second SIM does not need the RF resource, retain the RF resource with first SIM and receive the resource allocation, and in response to determine that the second SIM needs the RF, perform one of determine that an ongoing procedure on the first SIM is having a higher priority, and retain the RF resources with the first SIM, determine that a RF resource requirement on the second SIM is having higher priority, and releasing the RF resource by the first SIM and providing the RF resources to the second SIM, and determine that a RF resource requirement on the second SIM is having a higher priority, deferring an ongoing procedure on the first SIM, and providing the RF resource to the second SIM.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This method and system are illustrated in the accompanying drawings, throughout which like reference letters indicate corresponding parts in the various figures. The embodiments herein will be better understood from the following description with reference to the drawings, in which.

MODE FOR THE INVENTION

Figure 1:
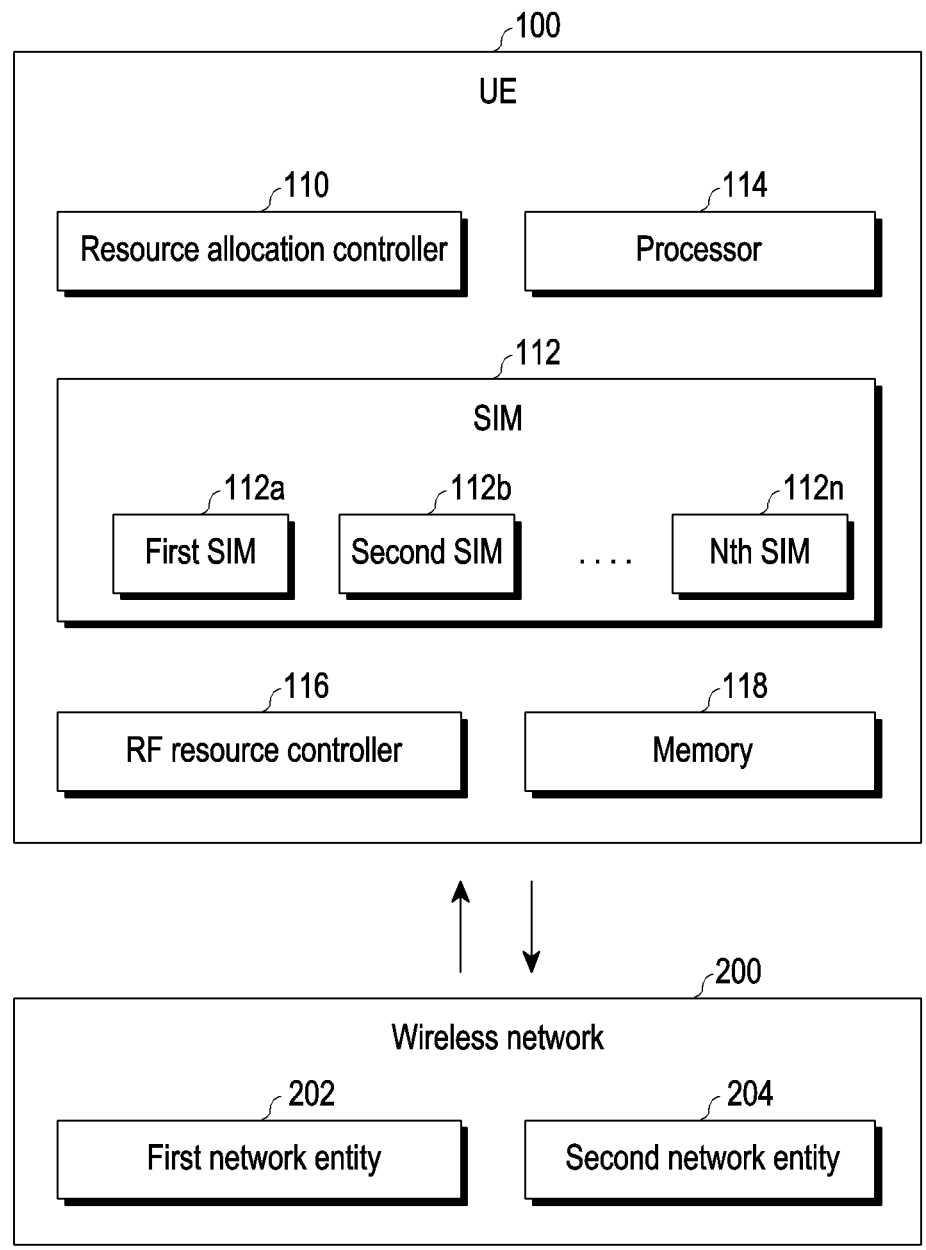
FIG. 1 illustrates a UE for handling resource allocation in a wireless communication system, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The terms, "first SIM" and "first USIM" are used interchangeably in the patent disclosure, "second SIM" and "second USIM" are used interchangeably in the patent disclosure, and "SIM" and "USIM" are used interchangeably in the patent disclosure.

Accordingly, embodiments herein disclose a method for handling resource allocation in a wireless communication system. The method includes registering, by a UE, a first SIM among a plurality of SIMs with a first network entity in the wireless communication system and a second SIM among the plurality of SIMs with a second network entity in the wireless communication system. Further, the method includes configuring, by the UE, a RF resource with the first SIM for at least one of a downlink reception and uplink transmission. Further, the method includes determining, by the UE, whether the second SIM needs the RF resource. Further, the method includes performing, by the UE, provisioning of the RF resource, comprising one of in response to determining that the second SIM does not need the RF resource, retaining the RF resource with first SIM and receiving the resource allocation, and in response to determining that the second SIM needs the RF, performing one of determining that an ongoing procedure on the first SIM is having a higher priority, and retaining the RF resources with the first SIM, determining that a RF resource requirement on the second SIM having higher priority, and releasing the RF resource by the first SIM and providing the RF resources to the second SIM, and determining that a RF resource requirement on the second SIM is having a higher priority, deferring an ongoing procedure on the first SIM, and providing the RF resource to the second SIM.

In the proposed method, the UE can recover from colliding reception occasions and missed downlink transmissions from connected networks using at least one of an assistance information configured by the UE and configuration information from the network.

Referring to the drawings, and more particularly to FIGS. 1 through 5, there are shown preferred embodiments.

FIG. 1 illustrates a UE (100) for handling resource allocation in the wireless communication system, according to an embodiment as disclosed herein. The wireless communication system includes the UE (100) and a wireless network (200). The electronic device (100) can be, for example, but not limited to a cellular phone, a smart phone, a Personal Digital Assistant (PDA), a wireless modem, a tablet computer, a laptop computer, an Internet of Things (IoT) device, a virtual reality device, and a smart watch. The UE (100) includes a resource allocation controller (110), a first SIM (112a), a second SIM (112b), $n^{th}$ SIM 112n (n=two or higher), a processor (114), a RF resource controller (116), and a memory (118). The processor (114) is coupled to the resource allocation controller (110), the first SIM (112a), the second SIM (112b), $n^{th}$ SIM (112n), the RF resource controller (116), and the memory (118). The RF resource controller (116) may include, e.g., at least one transmit antenna, at least one receive antenna, and a RF front end circuitry. The RF front end circuitry may include a transceiver, a transmit amplifier, a receive amplifier, filters, mixers, a modulator, and/or a demodulator, etc. The RF resource controller (116) may further include switching circuitry to switch communication between the RF front end circuitry and the different SIMs (in some cases, only one of the SIMs may be communicatively coupled to the RF front end circuitry of the RF resource at a time). It is noted that a "single RF resource" to be shared between the SIMs does not preclude the possibility of including other RF resources within the UE (100) to perform functionality other than that described herein with respect to the SIMs (112).

The wireless network (200) includes a first network entity (202) and a second network entity (204). In an embodiment, the first network entity (202) and the second network entity (202) are same. In another embodiment, the first network entity (202) and the second network entity (202) are different.

The first SIM (112a) is registered with the first network entity (202) in the wireless communication system and the second SIM (112b) is registered with the second network entity (204) in the wireless communication system.

The RF resource controller (116) configures a RF resource with the first SIM (112a) for at least one of a downlink reception and uplink transmission. Further, the RF resource controller (116) determines whether the second SIM (112b) needs the RF resource and performs provisioning of the RF resource. In an embodiment, if the second SIM (112b) does not need the RF resource, the processor (114) retains the RF resource with first SIM (112a) and receives the resource allocation. In another embodiment, if the second SIM (112b) needs the RF then, the processor (114) determines that an ongoing procedure on the first SIM (112a) having a higher priority, and retain the RF resources with the first SIM (112a) or determines that a RF resource requirement on the second SIM having higher priority, and releases the RF resource by the first SIM (112a) and provides the RF resources to the second SIM (112b), and determines that a RF resource requirement on the second SIM (112b) having a higher priority, defers an ongoing procedure on the first SIM (112a), and provides the RF resource to the second SIM (112b).

In an embodiment, provision of the RF resource between the first SIM (112a) and the second SIM (112b) comprises at least one of receiving a system information, monitoring a random access RAR window monitoring at the UE (100), monitoring a contention resolution timer at the UE (100), occurring of a 2-step random access procedure, and an occasion of a SI window for a requested on demand SI acquisition within a modification period.

In an embodiment, determine whether the second SIM (112b) needs the RF includes identify the need for the RF resource on the second SIM (112b), determine that the priority associated with at least one service to be accessed by the first SIM (112a) is lesser than a priority associated with at least one service with the second SIM (112b), and determine whether the second SIM (112b) needs the RF in response to determining that the priority associated with the at least one service to be accessed by the first SIM (112a) is lesser than the priority associated with the at least one service with the second SIM (112b).

In an embodiment, determine whether the second SIM (112b) needs the RF includes configure a logical channel priority threshold, determine whether a service on the first SIM (112a) is ongoing on a logical channel with a priority higher than the configured logical channel priority threshold; and perform one of in response to determine that the service on the first SIM (112a) is ongoing on the logical channel with the priority higher than the configured logical channel priority threshold, retain the RF resources on the first SIM, and in response to determine that the service on the first SIM (112a) is ongoing on the logical channel with the priority lesser than the configured logical channel priority threshold, provision the RF resources from the first SIM (112a) to the second SIM (112b).

In an embodiment, the logical channel priority threshold is configured by at least one of the UE (100) and a wireless network (200).

In an embodiment, determine whether the second SIM (112b) needs the RF includes identify that the second SIM (112b) needs the RF resource, determine a priority type of a RA trigger, and perform one of retain the RF resource on the first SIM (112a), if the priority type of the RA trigger is a high priority, and defer random access (RA) on the first SIM (112a) and providing the RF to the second SIM (112b), if the priority type of the RA trigger is a lower priority.

Further, the processor (114) is configured to identify collision of the RF resource for the second SIM (112b) and indicate the collision of RF resources to the second network entity (204) using a UE assistance information. The assistance information comprises at least one of a requested/preferred DRX parameters, by the UE (100), a preferred offset to paging frame where paging will be monitored, a preferred offset to paging occasion where a paging will be monitored, and a network confirms if the UE (100) applies UE specific DRX parameters based on an updated PF and PO offsets for paging monitoring. The assistance information is provided as one of as part of a Radio resource control (RRC) message and a bit in a registration request. The wireless network (200) provides confirmation about accepting the UE assistance information provided by the UE (100).

Further, the wireless network (200) is configured to identify that collision for RF resource exists and transmit repetition of a paging message on one of the first network entity (202) and the second network entity (204) based on the identification. The collision refers to occasion at which the first SIM (112a) and the second SIM (112b) needs RF resources at the same time. The paging message comprises paging cycles and allocating the RF resources to the first SIM (112a) and the second SIM (112b). The presence of the paging repetition is signaled based on a bitmap, wherein the bitmap indicates an index of paging cycles over which the repetition exists such that '1' indicates presence of paging and '0' indicates absence of paging repetition.

Although the FIG. 1 shows the hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function for handling resource allocation in the wireless communication system.

Figure 2:
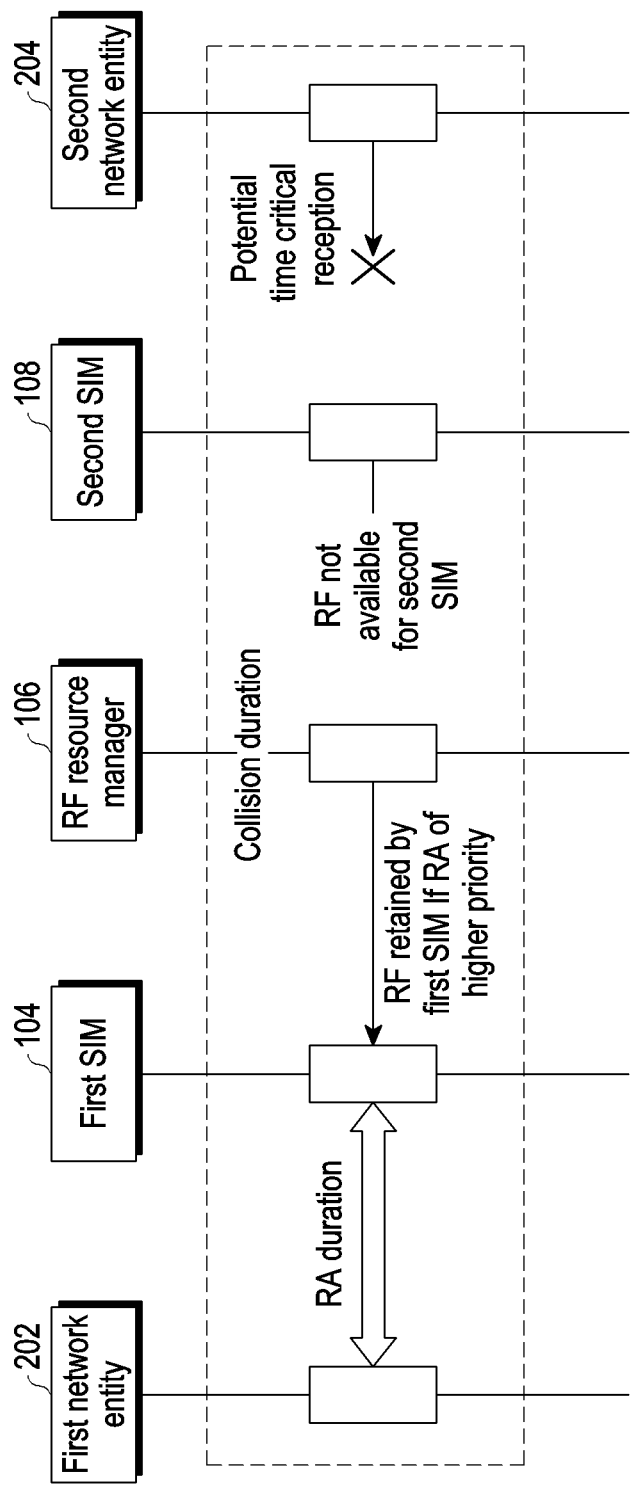
FIG. 2 illustrates an example procedure where RF resources are retained by USIM 1 for random access (both normal random access or 2 step random access). This also illustrates the case where, RA is treated as higher priority that reception of USIM 2, according to an embodiment as disclosed herein.

FIG. 2 illustrates an example procedure where the RF resources are retained by the first SIM (112a) for random access (both normal random access or 2 step random access (RA)). This also illustrates the case where, RA is treated as higher priority than reception of the second SIM (112b), according to an embodiment as disclosed herein.

In an example, the UE (100) does retains the RF resources on the first USIM, or the UE (100) does not tune away RF resources to other USIM(s) when the random access RAR window monitoring is ongoing at the UE (100). In an embodiment, the UE (100) retains the RF resources on the USIM, or the UE (100) does not tune away RF resources to other USIM(s) during the PDCCH monitoring occasions in the RAR window. In an embodiment, the UE (100) retains the RF resources on the USIM, or the UE (100) does not tune away RF resources to other USIM(s) during the entire random access procedure (i.e. from initiation of random access procedure until the completion of random access procedure). The procedure is illustrated in FIG. 2. The illustration is not limited and is applicable for any random access type and priority of random access.

Figure 3:
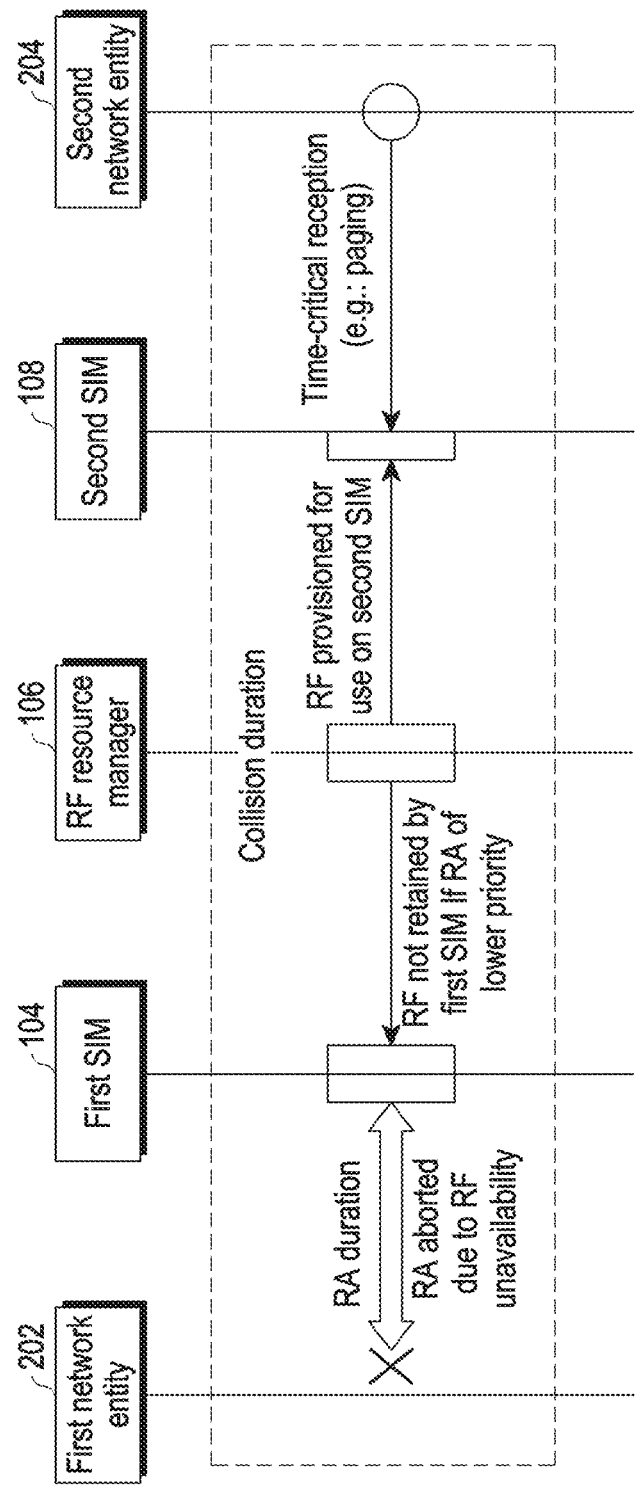
FIG. 3 illustrates an example procedure where the RF resources are re-provisioned from USIM 1 to USIM 2 for time critical reception on USIM 2 if RACH on USIM 1 is lower priority than reception on USIM 2, according to an embodiment as disclosed herein.

FIG. 3 illustrates an example procedure where the RF resources are re-provisioned from the first SIM (112a) to the second SIM (112b) for time critical reception on the second SIM (112b) if the RACH on the first SIM (112a) is lower priority than reception on the second SIM (112b), according to an embodiment as disclosed herein.

During a voice call, most deployments will configure a connected state DRX in conjunction with a semi-persistent scheduling of preconfigured grants (configured grant type 2 in NR), and logical channel SR masking configured over the logical channel carrying voice packets. As a result, there is no SR triggered for the logical channel configured for catering to the voice call, thereby ensuring that the voice packets are transmitted over the preconfigured resources or grants, and not on dynamically requested resources. Therefore, the random access initiated on the first USIM for sending SR for other logical channels can be treated as a lower priority as compared to that of paging monitoring (or any other operation) to be performed on another USIM (USIM2). Similarly, other random access requests on the first USIM can be treated as less priority compared to page monitoring (or other operations) on the second USIM, and the RF resources need not be retained during RAR window and contention resolution timer. In an embodiment, the RF resources are re-provisioned from the first USIM to the second USIM, when the operation on the second USIM is deemed to be of more importance and higher priority (than the random access on first USIM). The operation on the second USIM may be either of paging monitoring or any other procedure that is identified as higher priority. In another embodiment, the RF resources are re-provisioned from the first USIM to the second USIM, when the operation on the second USIM is deemed to be of more importance and higher priority, than the trigger initiated random access on first USIM. The procedure is illustrated in FIG. 3.

Figure 4:
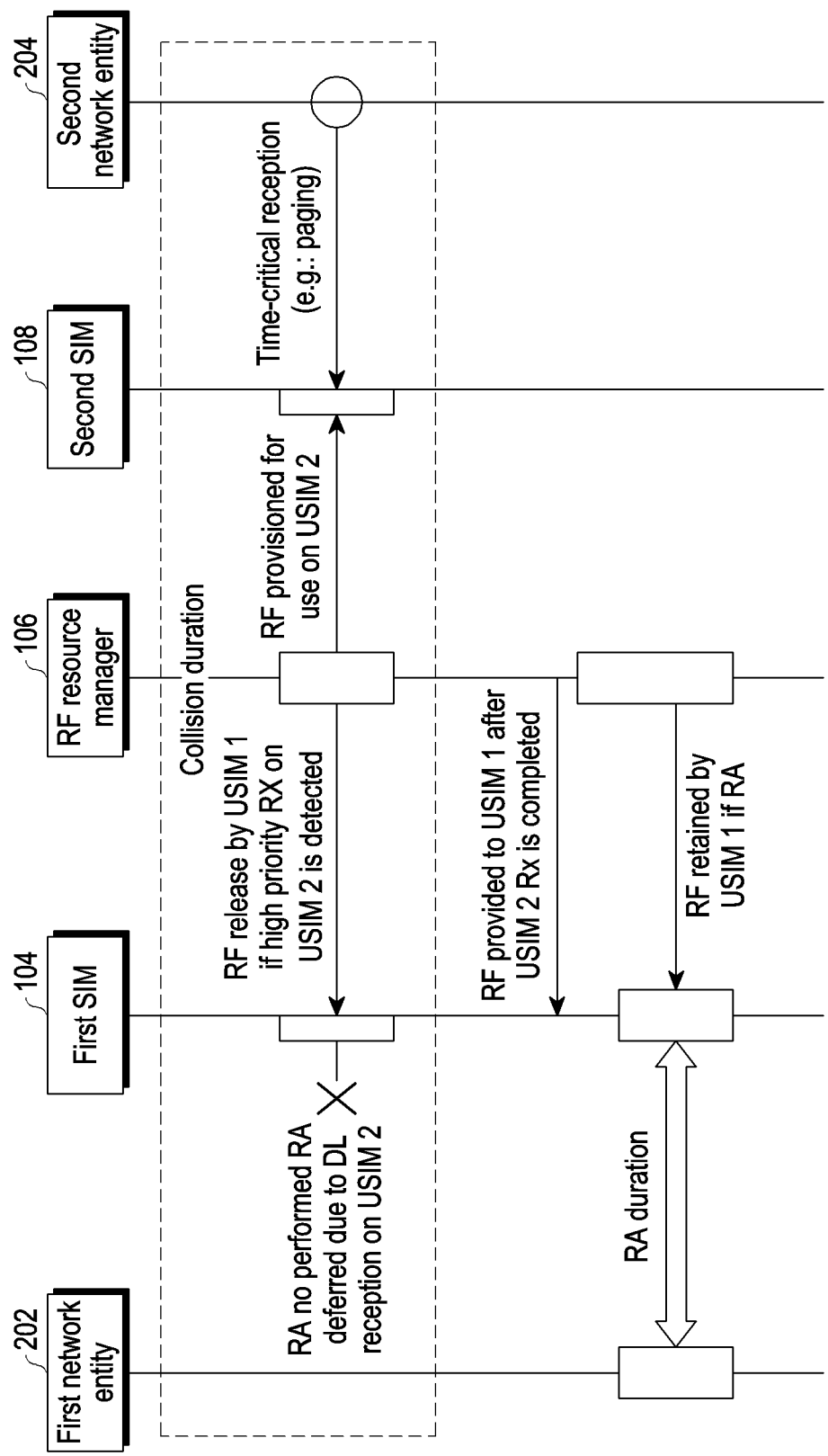
FIG. 4 illustrates an example procedure for lower priority random access on USIM 1 is deferred till time critical reception on USIM 2 is completed, if USIM 2 time critical reception occasion is predetermined, according to an embodiment as disclosed herein.

FIG. 4 illustrates an example procedure for lower priority random access on the first SIM (112a) is deferred till time critical reception on the second SIM (112b) is completed, if the time critical reception occasion is predetermined at the second SIM (112b), according to an embodiment as disclosed herein.

As illustrated earlier, not all random access are of the same priority, and some triggers for random access are more important and time critical than others. For example, the random access triggered for requesting on demand system information is of lower priority than the random access requested for connection control purposes. Therefore, it is possible to prioritize random access based on the triggering conditions. When a lower priority random access is triggered, and the random access resource/occasion/PRACH is available at a time that collides with critical reception on the other USIM, then the critical reception on the second USIM is treated with priority. Therefore, the RF resources are provided to the second USIM during such cases. Consequently, the random access is not performed over this occasion and is deferred to the first non-colliding occasion after RF resources are available to the first USIM. In an embodiment, the random access on the first USIM is deferred in order to complete critical reception on the second USIM. The random access on the first USIM is deferred until the first allowed PRACH occasion following the completion of critical reception of the second USIM, provided the RF resources are available to the first USIM. The procedure is illustrated in FIG. 4.

Figure 5:
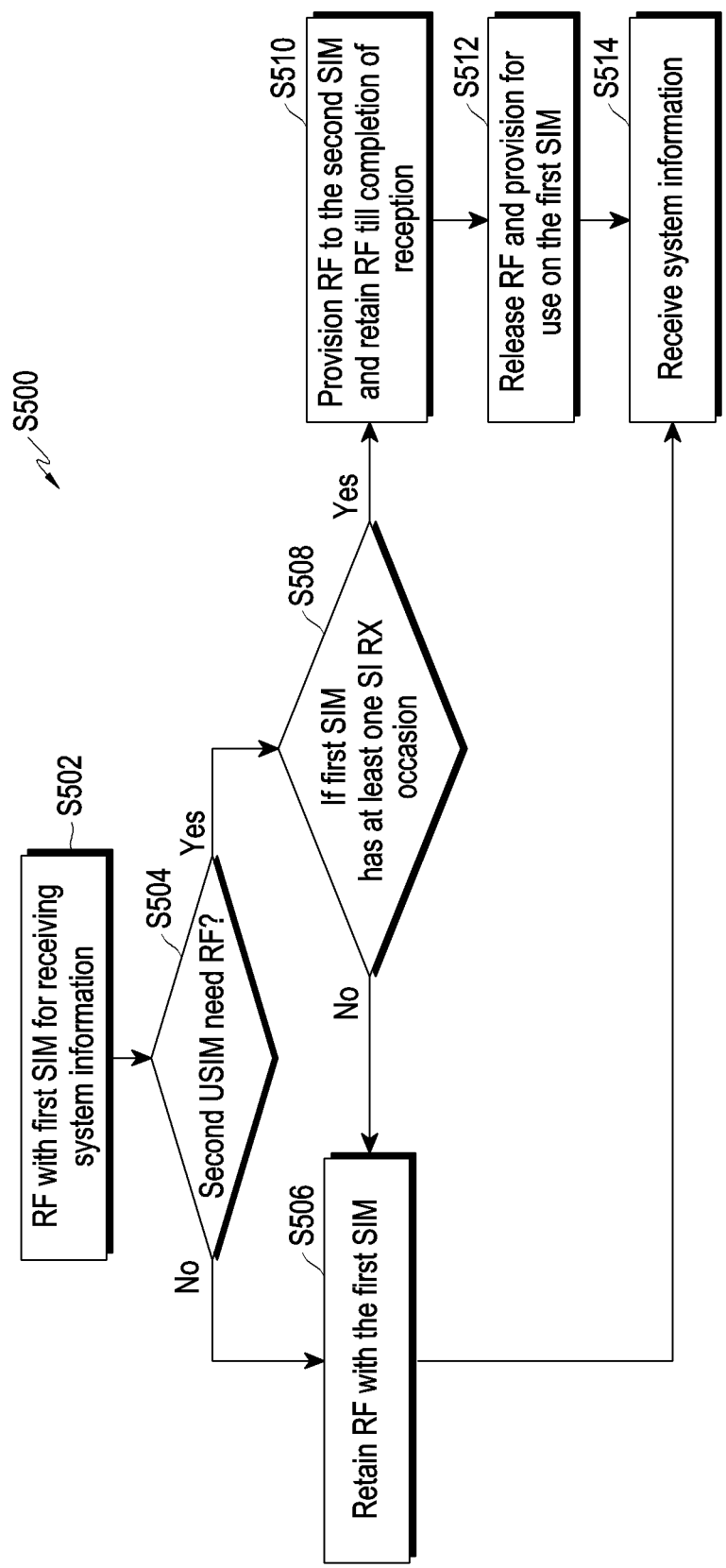
FIG. 5 illustrates an example method for RF resource re-provisioning based on System Information reception opportunities or occasions available in a SI modification period, according to an embodiment as disclosed herein.

FIG. 5 illustrates an example flow chart (S500) illustrating a method for RF resource re-provisioning based on System Information reception opportunities or occasions available in the SI modification period, according to an embodiment as disclosed herein. The operations (S502-S514) are performed by the resource allocation controller (110).

At S502, the method includes configuring the radio frequency with the first SIM (112a) for the resource allocation. At S504, the method includes determining whether the second SIM (112b) needs the RF. If the second SIM (112b) does not need the RF, at S506, the method includes retaining the RF with first SIM (112a). At S514, the method includes receiving the resource allocation, If the second SIM (112b) needs the RF, at S508, the method includes determining whether the first SIM (112a) has at least one SI Rx occasion. If the first SIM (112a) has at least one SI Rx occasion, at S510, the method includes provisioning the RF to the second SIM (S112b) and retaining the RF till completion of the reception. At S512, the method includes releasing the RF and provisioning for use on the first SIM. At S514, the method includes receiving the resource allocation.

Method 1a: Method for RF preservation and retention during ongoing random access procedure: In an example, in the dual SIM or a multi SIM device, there is possibility that more than one SIM initiates or engages in certain operations for which it requires the RF resources. The RF resources may include RF antenna elements, RF processing chain or circuitry, or both. Based on the UE hardware capability, only one USIM (112a) may be provisioned with the RF resources at a time (i.e. all the USIMs may not be provisioned with the RF resources at a time even if the UE (100) supports multiple simultaneous receive transmit RF chains—like that of a dual SIM dual active or a multi SIM multi active devices). As a result, the provisioning, reservation and preservation of the RF resources to the USIM (or to multiple USIMs) need to be prioritized based on the importance, priority and urgency of the procedure for which the USIM requires the RF resources. The RF resource requirement may include the regular paging message monitoring on the other USIM(s). This can be achieved based on setting certain rules.

One procedure where the UE (100) requires to retain and preserve the RF resources is during an ongoing random access procedure. That is, when the UE (100) is performing random access procedure on the first USIM, it should not tune away (introducing a case where the first USIM does not have RF resources with it) to monitor paging or to perform other procedures on other USIM(s) (say USIM2). Random access procedure may include up to 4 steps based on the type of random access procedure that is ongoing. The RF resources does not have to be retained with the USIM, on which random access is ongoing, at all times during the random access procedure. Instead, it has to be retained during certain stages/message monitoring during random access.

On sending a random access preamble to a serving node, during the random access response (RAR) window, the UE (100) monitors PDCCH in PDCCH monitoring occasions, where the PDCCH monitoring occasions are configured by a RAR search space, to identify successful reception of preamble (or MSG1) at the wireless network (200). During RAR window, the UE (100) has to monitor each of the available PDCCH over the configured search spaces in order to receive RAR message (or MSG2) from the wireless network (200). Therefore, during the RAR window, the reception should not be interrupted and hence the RF resources need to be retained. As a result, they cannot be tuned away to other USIM(s) for monitoring paging.

In an embodiment, the UE (100) does retains the RF resources on the first USIM, or the UE (100) does not tune away RF resources to other USIM(s) when the random access RAR window monitoring is ongoing at the UE (100). In an embodiment, the UE (100) retains the RF resources on the USIM, or the UE (100) does not tune away RF resources to other USIM(s) during the PDCCH monitoring occasions in the RAR window. In an embodiment, the UE (100) retains the RF resources on the USIM, or the UE (100) does not tune away RF resources to other USIM(s) during the entire random access procedure (i.e. from initiation of random access procedure until the completion of random access procedure). The procedure is illustrated in FIG. 2. The illustration is not limited and is applicable for any random access type and priority of random access.

The RAR message indicates if the wireless network (200 has successfully received the preamble and also provides uplink grants to be used for transmission of the RRC message or a MAC trigger (or MSG3) that initiated random access procedure. The UE (100) then waits to confirm success of contention resolution to determine if its uplink transmission to the wireless network (200) was successfully received (via reception of message 4). This is monitored over a network configured contention resolution timer. Similar to the case of the RAR window, the duration of contention resolution timer also should not be interrupted and hence the RF resources need to be retained. As a result, they cannot be tuned away to other USIM(s) for monitoring paging. In an embodiment, the UE does retains the RF resources on the USIM, or UE does not tune away RF resources to other USIM(s) when contention resolution timer is ongoing at the UE (100).

In release 16, a new type of RACH is being introduced where the entire contention based RACH procedure consists of only two messages—MsgA and MsgB. This type of random access is commonly referred to as a 2-step RACH procedure. In this type procedure, the MsgA consists of both the preamble sequence as well as the message (i.e., MAC PDU) that triggered the random access procedure. The UE (100) then monitors for MsgB during the MsgB reception window. In this type or random access, contention resolution takes places with the reception of MsgB and hence, the UE (100) waits for reception of MsgB to confirm successful random access completion. Therefore, it is imperative that the UE (100) shall monitor each of the reception occasion to verify successful reception of MsgB and thus need to retain the RF during this time. Since this type of random access procedure requires the RF for performing both the steps involved, it needs to retain the RF for the entire duration of the two step random access. In an embodiment, the UE (100) does retain the RF resources on the USIM, or the UE (100) does not tune away RF resources to other USIM(s) when the 2-step random access procedure is in progress. This procedure is also addressed in FIG. 2.

Random access procedure may be triggered by the UE (100) for one of the following:
  1. RRC Connection setup (connection establishment),
  2. RRC connection re-establishment procedure,
  3. On receiving reconfigurationWithSync (Handover, DU change etc),
  4. To request On Demand System Information (SI),
  5. Pending Scheduling Request (SR), when there are no PUCCH resources to send SR,
  6. Beam Failure Recovery initiated by MAC, 7 Reception of PDCCH order with/without random access preamble, and 8. SR failure.

It is observed that there are few triggers for random access that are of more importance than other with respect to serving the user in RRC connected state or to transitioning to connected state. For example, on demand SI reception may be of lesser priority than a random access related to the RRC connection control. Likewise, there are some procedures for which the random access itself can be of less priority or urgency, for example, if the random access is triggered for a background data due to periodic refresh of an application installed on the UE (100). Therefore, there are cases where the ongoing random access on the USIM, for which RF resources are required during RAR window and contention resolution timer, may be of a lesser priority than the paging message (or any other ongoing service) on the other USIM(s). For example, there are cases where the random access on the first USIM may be of lesser priority than a potential voice call paging on the other USIM.

During a voice call, most deployments will configure a connected state DRX in conjunction with a semi-persistent scheduling of preconfigured grants (configured grant type 2 in NR), and logical channel SR masking configured over the logical channel carrying voice packets. As a result, there is no SR triggered for the logical channel configured for catering to the voice call, thereby ensuring that the voice packets are transmitted over the preconfigured resources or grants, and not on dynamically requested resources. Therefore, the random access initiated on one the first USIM for sending SR for other logical channels can be treated as a lower priority as compared to that of paging monitoring (or any other operation) to be performed on another USIM (USIM2). Similarly, other random access requests on the first USIM can be treated as less priority compared to page monitoring (or other operations) on the second USIM, and the RF resources need not be retained during RAR window and contention resolution timer. In an embodiment, the RF resources are re-provisioned from the first USIM to the second USIM, when the operation on the second USIM is deemed to be of more importance and higher priority (than the random access on first USIM). The operation on the second USIM may be either of paging monitoring or any other procedure that is identified as higher priority. In another embodiment, the RF resources are re-provisioned from the first USIM to the second USIM, when the operation on the second USIM is deemed to be of more importance and higher priority, than the trigger initiated random access on first USIM. The procedure is illustrated in FIG. 3.

Alternatively, the priority of service or logical channels for which RF needs to be retained can be configured by the network (200). When there is session active and data transfer ongoing, on a logical channel for which the network configuration allows to retain RF resources, the UE (100) retains the RF for continuing with uninterrupted service on the USIM and does not tune away to monitor paging and other occasions on other USIM(s). Similarly, the network (200) can indicate a logical channel priority value, as a threshold to determine of the RF needs to be retained by a particular USIM during any ongoing service. In an embodiment, logical channels for which RF needs to be retained is configured by the network (200). In an embodiment, the RF is retained for the logical channels whose priority is greater than a threshold. The threshold can be configured by the network (200), for instance, the network (200) may provide this threshold in terms of logical channel priority value. Some RRC and NAS messages are important to be handled without any interruption and hence any RF tune away during this shall be avoided. In an embodiment, the RF is retained when there is data pending on logical channels associated with SRB. This may either be a predefined rule in the UE (100) or configured by the network (200).

```
LogicalChannelConfig ::=            SEQUENCE {
    ul-SpecificParameters           SEQUENCE {
        priority                    INTEGER (1..16),
        prioritisedBitRate          ENUMERATED {kBps0, kBps8,
kBps16, kBps32, kBps64, kBps128, kBps256, kBps512,
                                    kBps1024, kBps2048, kBps4096, kBps8192,
kBps16384, kBps32768, kBps65536, infinity},
        bucketSizeDuration          ENUMERATED {ms5, ms10, ms20,
ms50, ms100, ms150, ms300, ms500, ms1000,
                                    spare7, spare6, spare5, spare4,
spare3,spare2, spare1},
        allowedServingCells         SEQUENCE (SIZE
(1..maxNrofServingCells-1)) OF ServCellIndex
                                                        OPTIONAL,
    -- PDCP-CADuplication
        allowedSCS-List             SEQUENCE (SIZE (1..maxSCSs)) OF
SubcarrierSpacing   OPTIONAL, -- Need R
        maxPUSCH-Duration           ENUMERATED {ms0p02, ms0p04,
ms0p0625, ms0p125, ms0p25, ms0p5, spare2, spare1}
                                                        OPTIONAL,
    -- Need R
        configuredGrantType1Allowed ENUMERATED {true}
OPTIONAL, -- Need R
        logicalChannelGroup         INTEGER (0..maxLCG-ID)
OPTIONAL, -- Need R
        schedulingRequestID         SchedulingRequestId
OPTIONAL, -- Need R
        logicalChannelSR-Mask                   BOOLEAN,
        logicalChannelSR-DelayTimerApplied BOOLEAN,
        ...,
        bitRateQueryProhibitTimer   ENUMERATED { s0, s0dot4, s0dot8,
s1dot6, s3, s6, s12,s30} OPTIONAL -- Need R
    }                                                   OPTIONAL,
-- Cond UL
```

-continued

```
    [[
       musimRFRetain                    BOOLEAN
OPTIONAL,           -- Need R
    ]]
    ...
}
```

(a) And (b)—Network Controlled RF Retention Per Logical Channel (DRB or SRB)

```
MAC-CellGroupConfig ::=                 SEQUENCE {
    drx-Config                          SetupRelease { DRX-Config }
OPTIONAL,                   -- Need M
    schedulingRequestConfig             SchedulingRequestConfig
OPTIONAL,                   -- Need M
    bsr-Config                          BSR-Config
OPTIONAL,                   -- Need M
    tag-Config                          TAG-Config
OPTIONAL,                   -- Need M
    phr-Config                          SetupRelease { PHR-Config }
OPTIONAL,                   -- Need M
    skipUplinkTxDynamic                 BOOLEAN,
    ...,
    [[
    csi-Mask                            BOOLEAN
OPTIONAL,                   -- Need M
    dataInactivityTimer                 SetupRelease { DataInactivityTimer }
OPTIONAL                    -- Cond MCG-Only
    ]],
    [[
    musimRFRetainThreshold              INTEGER (1..16)
OPTIONAL - Need R
}
```

[1](a)

```
MAC-CellGroupConfig ::=                 SEQUENCE {
    drx-Config                          SetupRelease { DRX-Config }
OPTIONAL,                   -- Need M
    schedulingRequestConfig             SchedulingRequestConfig
OPTIONAL,                   -- Need M
    bsr-Config                          BSR-Config
OPTIONAL,                   -- Need M
    tag-Config                          TAG-Config
OPTIONAL,                   -- Need M
    phr-Config                          SetupRelease { PHR-Config }
OPTIONAL,                   -- Need M
    skipUplinkTxDynamic                 BOOLEAN,
    ...,
    [[
    csi-Mask                            BOOLEAN
OPTIONAL,                   -- Need M
    dataInactivityTimer                 SetupRelease { DataInactivityTimer }
OPTIONAL                    -- Cond MCG-Only
    ]],
    [[
    musimRFRetainThreshold              SetupRelease
{ MusimRFRetainThreshold }              OPTIONAL - Need R
    }
MusimRFRetainThreshold ::=              INTEGER (1..16)
```

Method 1b: Network Configured LCH Threshold Priority for Applying RF Retention level indicates that the random access triggers belonging to this level is treated a lower priority (and RF can be tuned away to other USIM) during RAR window and when contention resolution timer is running. In an embodiment, the serving cell or network (200) can configure the random access trigger types that are allowed to retain RF resources during ongoing RAR window or contention resolution timer (without tuning away to other USIMs even for paging monitoring). Alternatively, this rule can be predefined on the UE (100).

Similarly, it is also possible to group services for which the RF resources need to be retained if an RACH is triggered and the UE (100) is monitoring RAR of MSG4. Based on the grouping, one group is treated as higher priority and other group is treated as lower priority. For services belonging to higher priority, the RF resources are retained with the USIM on which RAR window or contention resolution timer is ongoing. The RF resources can be provision to other USIM (s) if the ongoing service on the first USIM belongs to lower priority group. In an embodiment, the serving cell or the network (200) can configure the services for which the USIM is allowed to retain RF resources during ongoing RAR window or contention resolution timer without tuning away to other USIMs even for paging monitoring. Alternatively, this rule can be predefined on the UE (100). In another embodiment, the network (200) may signal the applicability of RF retention (during RAR window and MSG4 reception) per RRC connection. The network (200) may signal this in RRC reconfiguration message or a part of a new MAC CE.

can be made aware of a potential overlap between the random access it has initiated and potentially impending downlink reception on the second USIM.

As illustrated earlier, not all random access are of the same priority, and some triggers for random access are more important and time critical than others. For example, the random access triggered for requesting on demand system information is of lower priority than the random access requested for connection control purposes. Therefore, it is possible to prioritize random access based on the triggering conditions. When a lower priority random access is triggered, and the random access resource/occasion/PRACH is available at a time that collides with critical reception on the other USIM, then the critical reception on the second USIM

```
RRCReconfiguration-v1560-IEs ::=              SEQUENCE {
    mrdc-SecondaryCellGroupConfig                SetupRelease { MRDC-
SecondaryCellGroupConfig }                    OPTIONAL, -- Need M
    radioBearerConifig2                       OCTET STRING (CONTAINING
RadioBearerConfig)                            OPTIONAL, -- Need M
    sk-Counter                                SK-Counter
OPTIONAL, -- Need N
    nonCriticalExtension                      RRCReconfiguration-v16xy-IEs
OPTIONAL
}
RRCReconfiguration-v16xy-IEs ::=              SEQUENCE {
    musimRFRetainLevel1                          MusimRFRetainLevel-IEs
OPTIONAL
    musimRFRetainLevel                           MusimRFRetainLevel-
IEsOPTIONAL
}
MusimRFRetainLevel-IES ::=                    SEQUENCE {
    rarRrcSetup                                  BOOLEAN
    Need R
    raRrcReestablishment                         BOOLEAN
    Need R
    raRrcReconfiguration                         BOOLEAN
    Need R
    raSchedulingRequest                          BOOLEAN
    Need R
    raBeamFailureRecovery                        BOOLEAN
    Need R
    raPdcchOrder                                 BOOLEAN
    Need R
}
    RRCReconfiguration-v1560-IEs ::=          SEQUENCE {
        mrdc-SecondaryCellGroupConfig            SetupRelease { MRDC-
SecondaryCellGroupConfig }                    OPTIONAL, -- Need M
    radioBearerConfig2                        OCTET STRING (CONTAINING
RadioBearerConfig)                            OPTIONAL, -- Need M
    sk-Counter                                SK-Counter
OPTIONAL, -- Need N
    nonCriticalExtension                      RRCReconfiguration-v16xy-IEs
OPTIONAL
}
RRCReconfiguration-v16xy-IEs ::=              SEQUENCE {
    musimRFRetain                                BOOLEAN
}
```

Method 1b: Method to delay random access on a USIM based on RF requirement on other USIM: Random access procedure on one the first USIM may collide in time domain with any time critical receive opportunity on the other USIM. One way to operate during this collision is to decide the priority of activity on each USIM and either retain the RF resources for the USIM with ongoing random access, or to tune away to receive on the other USIM based on embodiments proposed earlier. However, it is possible that such a collision between a critical reception (e.g., paging reception) on the second USIM and random access on the first USIM is determined before performing either of the procedures. In such cases, it is possible to determine the priority of procedure beforehand. Therefore, if there is a random access triggered on the first USIM, the first USIM is treated with priority. Therefore, the RF resources are provided to the second USIM during such cases. Consequently, the random access is not performed over this occasion and is deferred to the first non-colliding occasion after RF resources are available to the first USIM. In an embodiment, the random access on the first USIM is deferred in order to complete critical reception on the second USIM. The random access on the first USIM is deferred until the first allowed PRACH occasion following the completion of critical reception of the second USIM, provided the RF resources are available to the first USIM. The procedure is illustrated in FIG. 4.

Method 2: Method for RF resource re-provisioning based on SI opportunities available in a SI modification period. Apart from the collision between paging occasions on the two or more USIMs on a UE, there are potential collisions possible between other procedures as well. One such case is when the UE is attempting to decode on demand system information on a first USIM when there is paging occasion on the second using around the same time. Both of these procedures being handled on separate USIMs (OSI acquisition on USIM1 and paging monitoring on USIM2) are important procedures. Therefore, some rule has to be defined wherein a UE is made aware on how to handle such collisions.

A UE requests on demand system information (OSI) when the SI is not broadcast by the network. The UE requests it either by random access procedure with a preamble dedicated for OSI request (MSG1 based request), or by using MSG3 indicating cause as system information request. In a MSG1 based SI request, if RAR is received from the network, it is assumed as ACK to the SI request. In a MSG 3 based SI request, if MSG4 is received from the network, it is considered as ACK for the SI request. On demand system information are carried over system information windows (SI window) that are periodically configured in a cell. SI remains unchanged within the duration of a modification period and can change only after the completion of the current SI modification period. There are multiple SI windows carrying the same on demand system information within a SI modification period. Therefore, receiving at least the required system information on one of these occasions is sufficient for the UE to acquire the requisite information. The other duration within the modification period can allow the RF resources to be provisioned for paging monitoring on the other USIM. In an embodiment, RF resources are allowed to be provisioned to monitor paging or any other time critical or non-time critical activity on a second USIM if there is at least one SI window accession is available (after receiving ACK for OSI request) on the first USIM where the RF resources are available to USIML. In another embodiment, the RF resources are retained by the first USIM if there is only one SI window occasion for a requested on demand SI acquisition within a modification period (and UE has not received this SI in earlier windows after requesting the network for OSI), even if there is paging occasion on the second USIM. The procedure is illustrated in FIG. 4.

Method 3: Method to broadcast paging repetition cycle to UE: The UE (100) in the RRC IDLE state monitors paging message during its configured idle DRX On time. The network configures the DRX cycle such that the UE (100) transitions to wake up state in order to monitor for paging. The UE (100) monitors one paging occasion (PO) per DRX cycle. The PO is a set of PDCCH monitoring occasions and can consist of multiple time slots (e.g. sub frame or OFDM symbol) where paging DCI can be sent. The PDCCH monitoring occasions for paging are determined according to pagingSearchSpace as specified in TS 38.213 and firstPDCCH-MonitoringOccasionOfPO if configured. In current specification, the UE (100) is allowed to monitor only a single PO in the DRX cycle even if there are multiple paging occasions during its DRX cycle.

In a multi SIM UE, there are cases where the paging message or paging cycle for both the SIMs overlap and hence collide with each other. Therefore, the UE (100) has to make a decision on how to monitor the paging occasion on these. Any approach within the provisions of current specification, where the UE (100) is allowed to monitor only a single paging occasion in the DRX cycle, the UE (100) is bound to miss the paging occasion belonging to one of these SIMs. However, the UE (100) cannot be sure of the service for which it may be paged over either of these SIMs. Therefore, there is no straightforward way for the UE (100) to prioritize the paging monitoring on one SIM over the other. To overcome this issue and still maintain the principle of allowing the UE (100) to monitor one PO per DRX cycle, the RAN level paging retransmission mechanism is required to be introduced. In paging retransmission mechanism, the network (200) indicates the scheduling occasions of the repeated attempts to the paging message. Using this, any potentially missed paging message (due to collision of paging cycle on the multiple SIMs that the UE (100) supports), can be recovered by monitoring the scheduling occasions for the paging transmission. In order to achieve this intended behavior, the network (200) has to signal additional parameters in the paging configuration. The paging configuration (i.e., PCCH-Config) has to be enhanced to support signaling of an information element which indicates the number of successive paging cycles over which a paging message will be repeated by a gNB.

```
PCCH-Config ::=                    SEQUENCE {
    defaultPagingCycle                 PagingCycle,
    nAndPagingFrameOffset              CHOICE {
        oneT                               NULL,
        halfT                              INTEGER (0..1),
        quarterT                           INTEGER (0..3),
        oneEighthT                         INTEGER (0..7),
        oneSixteenthT                      INTEGER (0..15)
    },
    ns                                 ENUMERATED {four, two, one},
    firstPDCCH-MonitoringOccasionOfPO CHOICE {
        sCS15KHZoneT                                      SEQUENCE
(SIZE (1..maxPO-perPF)) OF INTEGER (0..139),
        sCS30KHZoneT-SCS15KHZhalfT
SEQUENCE (SIZE (1..maxPO-perPF)) OF INTEGER (0..279),
        sCS60KHZoneT-SCS30KHZhalfT-SCS15KHZquarterT
SEQUENCE (SIZE (1..maxPO-perPF)) OF INTEGER (0..559),
        sCS120KHZoneT-SCS60KHZhalfT-SCS30KHZquarterT-
SCS15KHZoneEighthT             SEQUENCE (SIZE (1..maxPO-perPF)) OF
INTEGER (0..1119),
        sCS120KHZhalfT-SCS60KHZquarterT-SCS30KHZoneEighthT-
SCS15KHZoneSixteenthT
                                                  SEQUENCE (SIZE
(1..maxPO-perPF)) OF INTEGER (0..2239),
        sCS120KHZquarterT-SCS60KHZoneEighthT-
```

```
SCS30KHZoneSixteenthT                    SEQUENCE (SIZE (1..maxPO-perPF))
OF INTEGER (0..4479),
    sCS120KHZoneEighthT-SCS60KHZoneSixteenthT
SEQUENCE (SIZE (1..maxPO-perPF)) OF INTEGER (0..8959),
    sCS120KHZoneSixteenthT
SEQUENCE (SIZE (1..maxPO-perPF)) OF INTEGER (0..17919)
    } OPTIONAL,                 -- Need R,
        [[ numPagingRepetition            INTEGER {1..X}
        Need R
]]
  ...
}
```

It is possible that the network (200) is unable to provide the repetitions in successive DRX cycles due to load on the cell or increased number of paging to the UE (100) performed during the time. Therefore, an alternative approach is to signal a bitmap of the DRX cycles over which the paging repetition will be scheduled. The bitmap indicates the DRX cycles following the original PO configuration i.e. the first bit corresponds to the next DRX cycle as compared to the original PO configuration. In other words, bit 1 in the bitmap corresponds to PO DRX+1 DRX cycles, bit 2 corresponds to PO DRX+2 and so on. Alternatively, the bitmap may indicate the index of DRX cycle or PO/PF combination where the paging (re)transmission for the MUSIM UE can occur. In such cases, the first bit indicates the first DRX cycle in the System Frame Number (SFN) cycle, $2^{nd}$ bit indicates the $2^{nd}$ DRX cycle in the SFN cycle and so on. The bitmap size is based on the number of DRX cycles possible within a SFN cycle of 1024 SFNs i.e. bitmap is of 4 bits if DRX cycle is 2.56 seconds, the bitmap is of 8 bits for DRX cycle of length 1.28 seconds and so on. This educates the UE (100) on when the paging retransmission occurs and can in turn help the UE (100) decide when to tune away from the serving USIM and monitor the other USIM. In an embodiment, the network (200) provides a bitmap indicating the DRX cycles during which the retransmission of a paging is transmitted.

Method 4: Method to indicate optimized UE specific DRX cycle from the network (200): In current specifications, the UE (100) can request a UE specific DRX cycle to the network (200) during initiate or periodic registration requests. The UE (100) can also initiate a new registration request in order to request for a new or different UE specific DRX cycle. In response, the network (200) provides the registration accept with the negotiated DRX cycle length. In most cases, the network (200) provided negotiated DRX cycle matches to the UE requested DRX cycle. In addition to the UE requested DRX (UE specific DRX requested in NAS registration procedure), the RAN provides s default DRX cycle to the UE (100). The RAN provided DRX cycle may be the same as the negotiated DRX provided in registration accept, or different. The UE (100) applies the shortest of the UE specific DRX value(s), if configured by the RRC and/or upper layers, and a default DRX value broadcast in system information. If UE specific DRX is not configured by RRC or by upper layers, the default value is applied.

The USIM UE may detect a collision between paging occasion on one USIM and paging or other time critical occasions on other USIM(s). In such cases, there are no existing mechanisms to overcome this collision and at least the paging occasion associated to one USIM will potentially be missed. One way to solve the issue of missed paging occasion on the USIM is to assist the associated network to modify the PO for the UE. In an embodiment, the UE (100) assists the serving network to modify the paging configuration or paging transmission based on the assistance information received from the UE (100).

As per the provisions in the current specification, the requested DRX parameters (UE specific DRX) only conveys the DRX cycle length. The method to request a modified DRX cycle is by indicating a different value of DRX cycle in the registration request from the UE (100). When the MUSIM UE detects a paging occasion collision, it initiates a registration request to one of the networks or serving cell associated to the USIMs where collision is detected, in order to request for a different DRX cycle. However, the current UE behavior is to use the shortest of the upper layers provided DRX (UE specific DRX or the negotiated DRX parameters that are received during registration) and the default DRX broadcast in system information. When the UE performs registration procedure with requested DRX parameters indicating a shorted DRX cycle, the UE applies this DRX cycle if the DRX parameters is confirmed by network, and the same parameters are signaled as part of negotiated DRX parameters in the registration accept message. However, if the requested DRX cycle is of a longer length than the default DRX broadcast in system information, then there is no difference to UE paging monitoring as the UE (100) uses the shortest of the UE specific and the default DRX cycles for paging monitoring. In order to avoid this issue, it is required by the UE (100) to indicate that the requested DRX parameters (or UE specific DRX parameters that are requested in registration message) will be applied by the UE (100) for paging monitoring irrespective of the default DRX signaled in system information. Therefore a new indication is required to be sent to the network. This indication may either be added as part of the available spare bits in requested DRX parameters within registration request, or as a new IE in the registration request. It is possible that the UE (100) has requested for updated DRX parameters but the network has not honored that request. Therefore, it has to be ensured that the UE would update the paging monitoring occasion to the UE specific DRX only if the negotiated DRX parameters IE in the registration accept message indicate that the updated DRX parameters have to be used by the UE (100) for paging monitoring (irrespective of default paging cycle broadcast in system information). In an embodiment, the MUSIM UE indicates to at least one of its associated networks that it will use the UE specific DRX cycle for paging monitoring in order to avoid PO or other time critical occasion collision with another USIM (i.e. the UE indicates a preferred T to be used for paging monitoring). In another embodiment, the network confirms if the UE Can apply the UE specific DRX parameters for paging monitoring irrespective of the default DRX broadcast in system information.

5GS DRX Parameters Information Element

TABLE 1

DRX value (bits 5 to 1 of octet 3)
This field represents the DRX cycle parameter 'T'
as defined in 3GPP TS 38.304 [28].

| Bits | | | | |
|---|---|---|---|---|
| 4 | 3 | 2 | 1 | |
| 0 | 0 | 0 | 0 | DRX value not specified |
| 0 | 0 | 0 | 1 | DRX cycle parameter T = 32 |
| 0 | 0 | 1 | 0 | DRX cycle parameter T = 64 |
| 0 | 0 | 1 | 1 | DRX cycle parameter T = 128 |
| 0 | 1 | 0 | 0 | DRX cycle parameter T = 256 |

All other values shall be interpreted as "DRX value not specified" by this version of the protocol.
Bit 5 represents that UE will use this DRX for paging monitoring
Bits 6 to 8 of octet 3 are spare and shall be coded as zero.

TABLE 2

DRX to Use value (bits N to 1 of octet X)
This field represents the DRX cycle to be used for paging monitoring
(during MUSIM PO collision) as defined in 3GPP TS 38.304 [28].

| Bits 2 | |
|---|---|
| 0 | Use shortest of default DRX and UE specific DRX for paging monitoring |
| 1 | Use UE specific DRX for paging |

All other values shall be interpreted as "DRX value not specified" by this version of the protocol.
Bits 3 to 8 of octet X are spare and shall be coded as zero.

Simply providing a different DRX cycle length cannot solve the problem, it can only make the collision less frequent, as there will still exist harmonics where the collisions still occur. Therefore, UE needs to assist the network with more information based on which the collision can be totally avoided. One way to achieve this is by shifting in time domain, the paging occasion on a cell or USIM. This can be implemented by assisting the network with time domain shifting that can be applied to the paging frame and paging occasion in the frame. This way, each paging message that is sent to a USIM is always shifted with this assisted information and hence all collisions can be avoided. In an embodiment, the UE provides the network with the preferred offset to paging frame where paging will be monitored. In another embodiment, the UE provides the network with the preferred offset to paging occasion where paging will be monitored. The offset value indicates the time shift in terms the shift relative the current PF and PO used for paging monitoring. The PF offset indicates time shift in unit of radio frame and the PO offset indicates the time shift in unit of PO index. In an embodiment, the assistance information may either be as part of NAS triggered registration update triggered for updating UE specific DRX cycle. In another embodiment, the network confirms if the UE can apply the UE specific DRX parameters based on the updated PF and PO offsets, for paging monitoring irrespective of the default DRX broadcast in system information.

Alternatively, a PF offset can be indicated to the network wherein the PF offset is calculated based on DRX cycled of the UE (i.e. T) and number of paging frames in the DRX cycle (i.e. N). The offset indicates the paging frame (PF) index from its calculated PF, within the DRX cycle where the UE can receive paging message. The paging frame i.e. PF, is calculated as X+(T/N)*Y wherein X is the SFN corresponding to the calculated PF. For example, if T/2 is configured by the network, there is a PF available at every alternate radio frame in the DRX. A PF offset of '1' indicates that the UE monitors the 1st PF following the calculated PF, which is 2 radio frames from the calculated PF.

TABLE 3

DRX to Use value (bits N to 1 of octet X)
This field represents the DRX cycle to be used for paging monitoring
(during MUSIM PO collision) as defined in 3GPP TS 38.304 [28].

| Bits 2 | |
|---|---|
| 0 | Use shortest of default DRX and UE specific DRX for paging monitoring |
| 1 | Use UE specific DRX for paging |

| Bits | | | | |
|---|---|---|---|---|
| 6 | 5 | 4 | 3 | |
| 0 | 0 | 0 | 0 | PF Offset 0 |
| 0 | 0 | 0 | 1 | PF Offset 1 |
| 0 | 0 | 1 | 0 | PF Offset 2 |
| 0 | 0 | 1 | 1 | PF Offset 3 |
| 0 | 1 | 0 | 0 | PF Offset 4 |
| 0 | 1 | 0 | 1 | PF Offset 5 |
| 0 | 1 | 1 | 0 | PF Offset 6 |
| 0 | 1 | 1 | 1 | PF Offset 7 |
| 1 | 0 | 0 | 0 | PF Offset 8 |
| 1 | 0 | 0 | 1 | PF Offset 9 |
| 1 | 0 | 1 | 0 | PF Offset 10 |
| 1 | 0 | 1 | 1 | PF Offset 11 |
| 1 | 1 | 0 | 0 | PF Offset 12 |
| 1 | 1 | 0 | 1 | PF Offset 13 |
| 1 | 1 | 1 | 0 | PF Offset 14 |
| 1 | 1 | 1 | 1 | PF Offset 15 |

| Bits | | |
|---|---|---|
| 8 | 7 | |
| 0 | 0 | PO Offset 1 |
| 0 | 1 | PO Offset 2 |
| 1 | 1 | PO Offset 4 |

All other values shall be interpreted as "DRX value not specified" by this version of the protocol.
Bit 5 represents that UE will use this DRX for paging monitoring
Bits 6 to 8 of octet 3 are spare and shall be coded as zero.

In another embodiment, the assistance information can be provided as part of an RRC message over an RRC connection which was established for performing registration request for UE specific DRX change. In this case, the NAS layer triggers registration update indicating an update in UE specific DRX parameters. The RRC layer sends UE assistance information to the network indicating a preferred DRX parameters which may include some or all of preferred DRX cycle length (preferred T), a preferred paging frame offset (Preferred PF offset) and a preferred paging occasion offset (PO offset of Ns offset). The network can provide updated paging monitoring configuration (based on the UE Assistance) in RRC reconfiguration message. Alternatively, this configuration from the network (either full paging configuration, or indication allowing to apply the UE Assisted paging configuration) can be provided in RRC release message. This configuration should not be released with the UE enters RRC INACTIVE or RRC IDLE state and has to be retained.

Since the paging configurations are cell specific, it is possible that the paging collision problem resurfaces on cell reselection of one or more USIMs. One method is to renegotiate the configuration with the new serving cell every time on reselection. However, this may lead to a case where the UE misses some paging that may have been transmitted during the paging cycle negotiation. An alternative approach is to signal this configuration per UE to each of the gNB in the paging area. Since paging is performed at registration area level for UEs in RRC IDLE, all the gNBs within the registration area has to be made aware of this updated paging configuration on the UE. Since paging is performed at RNA area level for UEs in RRC INACTIVE, all the gNBs within the RNA area has to be made aware of this updated paging configuration on the UE. It is still possible that paging collisions are detected on cell reselection within the registration area. In such cases, the UE renegotiates the paging configuration with the serving gNBs.

The various actions, acts, blocks, steps, or the like in the flow diagram 500 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using network management functions, to control the elements, running on at least one hardware device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within scope of the embodiments as described herein.

The invention claimed is:

1. A method performed by a user equipment (UE) for handling resource allocation in a wireless communication system, the method comprising:
   registering a first subscriber identity module (SIM) among a plurality of SIMs with a first network entity in the wireless communication system and a second SIM among the plurality of SIMs with a second network entity in the wireless communication system;
   configuring a radio frequency (RF) resource with the first SIM for at least one of a downlink reception and an uplink transmission;
   receiving, from the first network entity, a message including configuration information indicating whether to retain the RF resource with the first SIM while a random access response (RAR) window or a contention resolution timer is ongoing on the first SIM;
   determining whether the second SIM needs the RF resource; and
   performing provisioning of the RF resource with at least one of the first SIM and the second SIM based on the determination,
   wherein performing provisioning of the RF resource comprising retaining the RF resource with the first SIM while the RAR window or the contention resolution timer is ongoing based on the configuration information.

2. The method of claim 1, wherein determining whether the second SIM needs the RF resource comprises:
   identifying a need for the RF resource on the second SIM;
   determining that a priority associated with at least one service to be accessed by the first SIM is less than a priority associated with at least one service with the second SIM; and
   determining whether the second SIM needs the RF resource in response to determining that the priority associated with the at least one service to be accessed by the first SIM is less than the priority associated with the at least one service with the second SIM.

3. The method of claim 1, wherein determining whether the second SIM needs the RF resource comprises:
   configuring a logical channel priority threshold;
   determining whether a service on the first SIM is ongoing on a logical channel with a priority higher than the configured logical channel priority threshold; and
   performing one of:
      in response to determining that the service on the first SIM is ongoing on the logical channel with the priority higher than the configured logical channel priority threshold, retaining the RF resource on the first SIM, and
      in response to determining that the service on the first SIM is ongoing on the logical channel with the priority less than the configured logical channel priority threshold, provisioning the RF resources from the first SIM to the second SIM.

4. The method of claim 3, wherein the logical channel priority threshold is configured by at least one of the UE and a wireless network.

5. The method of claim 1, wherein determining whether the second SIM needs the RF resource comprises:
   identifying that the second SIM needs the RF resource;
   determining a priority type of a random access (RA) trigger; and
   performing one of:
      retaining the RF resource on the first SIM, in case that the priority type of the RA trigger is a high priority, and
      deferring random access (RA) on the first SIM and providing the RF to the second SIM, in case that the priority type of the RA trigger is a lower priority.

6. The method of claim 1, further comprising:
   identifying collision of the RF resource for the second SIM; and
   indicating the collision of the RF resources to the second network entity using UE assistance information,
   wherein confirmation about accepting the UE assistance information provided by the UE is provided by a wireless network.

7. The method of claim 6, wherein the UE assistance information comprises at least one of preferred discontinuous reception (DRX) parameters by the UE, a preferred offset to paging frame where paging will be monitored, a preferred offset to paging occasion where a paging will be monitored, and a wireless network confirms if the UE applies UE specific DRX parameters based on an updated paging frame (PF) and paging occasion (PO) offsets for paging monitoring.

8. The method of claim 6, wherein the UE assistance information is provided as one of as part of a radio resource control (RRC) message and a bit in a registration request.

9. The method of claim 1,
   wherein collision for the RF resource exists is identified by a wireless network, and wherein repetition of a paging message on one of the first network entity and the second network entity is transmitted to the UE based on the identification by the wireless network.

10. The method of claim 9, wherein the collision refers to occasion at which the first SIM and the second SIM needs the RF resources at the same time.

11. The method of claim 9, wherein the paging message comprises paging cycles and allocating the RF resource to the first SIM and the second SIM.

12. The method of claim 9, wherein a presence of the paging repetition is signaled based on a bitmap, wherein the bitmap indicates an index of paging cycles over which the repetition exists.

13. A user equipment (UE) for handling resource allocation in a wireless communication system, the UE comprising:
   a transceiver;
   a plurality of subscriber identity modules (SIMs) associated with a radio frequency (RF) resource; and
   at least one processor, coupled with the transceiver and the plurality of SIMs, configured to:
      register a first SIM among the plurality of SIMs with a first network entity in the wireless communication system and a second SIM among the plurality of SIMs with a second network entity in the wireless communication system,
      configure a radio frequency (RF) resource with the first SIM for at least one of a downlink reception and an uplink transmission,
      receive, from the first network entity, a message including configuration information indicating whether to retain the RF resource with the first SIM while a random access response (RAR) window or a contention resolution timer is ongoing on the first SIM,
      determine whether the second SIM needs the RF resource, and
      perform provisioning of the RF resource with at least one of the first SIM and the second SIM based on the determination, and
      retain the RF resource with the first SIM while the RAR window or the contention resolution timer is ongoing based on the configuration information.

14. The UE of claim 13, wherein the at least one processor is configured to:
   identify a need for the RF resource on the second SIM,
   determine that a priority associated with at least one service to be accessed by the first SIM is less than a priority associated with at least one service with the second SIM, and
   determine whether the second SIM needs the RF resource in response to determining that the priority associated with the at least one service to be accessed by the first SIM is less than the priority associated with the at least one service with the second SIM.

15. The UE of claim 13,
   wherein the at least one processor is configured to:
      configure a logical channel priority threshold,
      determine whether a service on the first SIM is ongoing on a logical channel with a priority higher than the configured logical channel priority threshold, and
      perform one of:
         in response to determining that the service on the first SIM is ongoing on the logical channel with the priority higher than the configured logical channel priority threshold, retaining the RF resource on the first SIM, and
         in response to determining that the service on the first SIM is ongoing on the logical channel with the priority less than the configured logical channel priority threshold, provisioning the RF resources from the first SIM to the second SIM, and
   wherein the logical channel priority threshold is configured by at least one of the UE and a wireless network.

16. The UE of claim 13, wherein the at least one processor is configured to:
   identify that the second SIM needs the RF resource;
   determine a priority type of a random access (RA) trigger; and
   perform one of:
      retaining the RF resource on the first SIM, in case that the priority type of the RA trigger is a high priority, and
      deferring random access (RA) on the first SIM and providing the RF to the second SIM, in case that the priority type of the RA trigger is a lower priority.

17. The UE of claim 13,
   wherein the at least one processor is further configured to:
      identify collision of the RF resource for the second SIM, and
      indicate the collision of the RF resources to the second network entity using UE assistance information,
   wherein confirmation about accepting the UE assistance information provided by the UE is provided by a wireless network,
   wherein the UE assistance information comprises at least one of preferred discontinuous reception (DRX) parameters by the UE, a preferred offset to paging frame where paging will be monitored, a preferred offset to paging occasion where a paging will be monitored, and the wireless network confirms if the UE applies UE specific DRX parameters based on an updated paging frame (PF) and paging occasion (PO) offsets for paging monitoring, and
   wherein the UE assistance information is provided as one of as part of a radio resource control (RRC) message and a bit in a registration request.

18. The UE of claim 13,
   wherein collision for the RF resource exists is identified by a wireless network,
   wherein repetition of a paging message on one of the first network entity and the second network entity is transmitted to the UE based on the identification by the wireless network,
   wherein the collision refers to occasion at which the first SIM and the second SIM needs the RF resources at the same time,
   wherein the paging message comprises paging cycles and allocating the RF resource to the first SIM and the second SIM, and
   wherein a presence of the paging repetition is signaled based on a bitmap, wherein the bitmap indicates an index of paging cycles over which the repetition exists.

* * * * *